United States Patent [19]

Sumrell et al.

[11] Patent Number: 4,948,076
[45] Date of Patent: Aug. 14, 1990

[54] SPEAKER SUPPORT STAND

[76] Inventors: K. Drew Sumrell, 127 Oaks Dr.; Don R. Blair, P.O. Box 206; Dave Johnson, Rte. 5, Box 625, all of Boone, N.C. 28607

[21] Appl. No.: 392,584

[22] Filed: Oct. 2, 1989

[51] Int. Cl.5 .............................................. A47G 29/00
[52] U.S. Cl. ..................................... 248/125; 248/149; 248/161; 248/176; 248/244
[58] Field of Search ............... 248/125, 132, 149, 161, 248/157, 176, 244, 295, 327, 127, 676, 122, 371; 381/205; 108/106, 144, 159

[56] References Cited

U.S. PATENT DOCUMENTS

| | | | |
|---|---|---|---|
| 2,726,126 | 12/1955 | Poel | 108/144 |
| 2,760,650 | 8/1956 | Franks | 108/144 UX |
| 2,802,575 | 8/1957 | Harrison | 108/106 |
| 4,520,981 | 6/1985 | Harrigan | 248/125 X |
| 4,753,408 | 6/1988 | Wailes | 248/161 X |
| 4,765,580 | 8/1988 | Wright | 248/127 X |

Primary Examiner—Ramon O. Ramirez
Attorney, Agent, or Firm—Rhodes, Coats & Bennett

[57] ABSTRACT

A speaker support for elevating and supporting a speaker comprising a base, at least three support dowels attached to the base and extending upwardly from the base. The dowels include a first support dowel located laterally between second and third supports dowel that are both spaced forward of the first support dowel. A support shelf extending forwardly from the support dowels and having openings corresponding to the support shelf to be vertically adjustable along the support dowels. The support shelf tends to pivot about the support dowels when a speaker is placed on the support shelf, causing a locking action at the support shelf openings and the dowel supports which prevents the support shelf from moving downward on the dowel supports.

14 Claims, 5 Drawing Sheets

SPEAKER SUPPORT STAND

FIELD OF INVENTION

The present invention relates to a speaker support structure and more particularly to a speaker support structure of the type designed to be vertically adjusted so as to support a speaker above floor level.

BACKGROUND OF THE INVENTION

Audiophiles spend thousands of dollars on equipment and accessories in attempting to produce the highest quality sound reproduction possible. An important consideration towards this goal of quality sound reproduction is the proper placement of the sound speakers. The optimum speaker height will vary depending on the type of music, individual taste, and music setting desired. Therefore, an apparatus or method for allowing exact vertical selection of speaker location would help people produce a more personally desireable sound reproduction.

In the past, music listeners have not had an efficient and effective way to solve this problem. Some music listeners have resorted to using a plurality of speaker support stands with various fixed heights. However, even using this inefficient method, listeners can not choose the precise speaker height desired because possible speaker heights are limited by the number of fixed height adjustment positions provided by speaker support. Due to the ineffectiveness and lack of past methods for adjusting speaker height, many music listeners have been forced to overlook the importance of speaker height in producing on each listening occasion a personally satisfying sound reproduction.

Therefore, a speaker support stand is needed that will allow a music listener to adjust a speaker at an infinite number of vertical positions along the speaker support stand in order to achieve the exact desired speaker height and a corresponding higher quality sound reproduction.

SUMMARY OF THE INVENTION

The present invention is a vertically adjustable support stand for elevating and supporting a speaker at an infinite number of positions along the speaker support structure. The speaker support structure includes a base and support dowels mounted on the base and extending vertically upwards from the base. A top connector is interconnected at the top of the support dowels for stabilizing the support dowels and also for providing a back rest for a speaker. A cantilever speaker support shelf having a rear section and front section is disposed between the top connector and the base along the support dowels. The rear section of the support shelf has openings through which respective support dowels are inserted such that the wall structure of each support shelf opening encompasses the respective support dowel. On the bottom of the support shelf, the edges of the support shelf openings are chamfered and o-rings encircling the support dowels may be rolled into this chamfered area. Extending outward from the dowels and rear portion of the support shelf is the front portion of the support shelf on which a speaker may be placed.

To adjust the speaker to the desired height, the o-rings are removed from the chamfered area of the support shelf openings and ten the support shelf is moved along the support dowels to a selected height. When a height for the support stand is chosen, the o-rings are moved into the chamfered area of the support shelf openings to prepare the speaker stand fork the speaker. A speaker is then placed on the front section of the support shelf and the weight of the speaker causes a downward force on the front section. This causes forces to be exerted between the support dowels and the encompassing walls of the support shelf openings which lock the support shelf into position on the support dowels. The o-rings provide a secondary mechanism to lock the support shelf in position on the dowels and prevent downward slippage. These two locking mechanisms provide a stable support for the speaker resting on the support shelf. In addition, the speaker can be rested against the top connector to provide more support. To readjust the speaker height, the speaker is simply removed from the support stand, and as previously described, the support stand is shifted to a new position and the speaker replaced on the adjusted support shelf.

From the foregoing, it is apparent that a primary object of the present invention is to provide a speaker support stand capable of positioning a speaker at an infinite number of vertical position along the speaker support stand.

Another object of the present invention is to provide a speaker support stand that can be conveniently adjusted by hand (without tools) to alter the height of a speaker on the speaker support stand.

Another object of the present invention is to provide a vertically adjustable speaker support stand that has a back rest for supporting the speaker.

A further object of the present invention resides in the provision of a speaker support stand of the character referred to above that is provided with a cantilevered supported speaker support shelf that can be infinitely vertically adjusted along an upright support structure.

Still a further object of the present invention resides in the provision of a vertically adjustable speaker support structure that utilizes a cantilevered supported speaker support shelf that is confined about a plurality of dowels such that when the speaker support shelf is placed in a selected vertical position about the dowel and a speaker is placed thereon, there is provided a binding action between the speaker support shelf and the respective dowel so as to securely station the speaker support shelf about the dowels.

Still a further object of the present invention is to provide a secondary securing mechanism for securing the speaker support shelf about the dowels.

Another object of the present invention resides in the provision of a speaker support structure that enables a speaker to be supported at various heights above floor level wherein the weight of the speaker itself plays a primary roll in supporting the speaker support shelf at a selected height.

Still a further object of the present invention resides in the provision of a speaker support structure of the character referred to above that is relatively simple in design but yet durable and operative to support a speaker at an infinite number of vertically spaced positions above the floor level.

Still a further object of the present invention resides in the provision of a speaker support stand of the character referred to above which is easily assembled and disassembled, and which is particularly adopted to be shipped in a disassembled fashion.

Other objects and advantages of the present invention will become apparent and obvious from a study of the following description and the accompanying drawings which are merely illustrative of such invention.

DETAILED DESCRIPTION OF THE INVENTION

Figure 1:
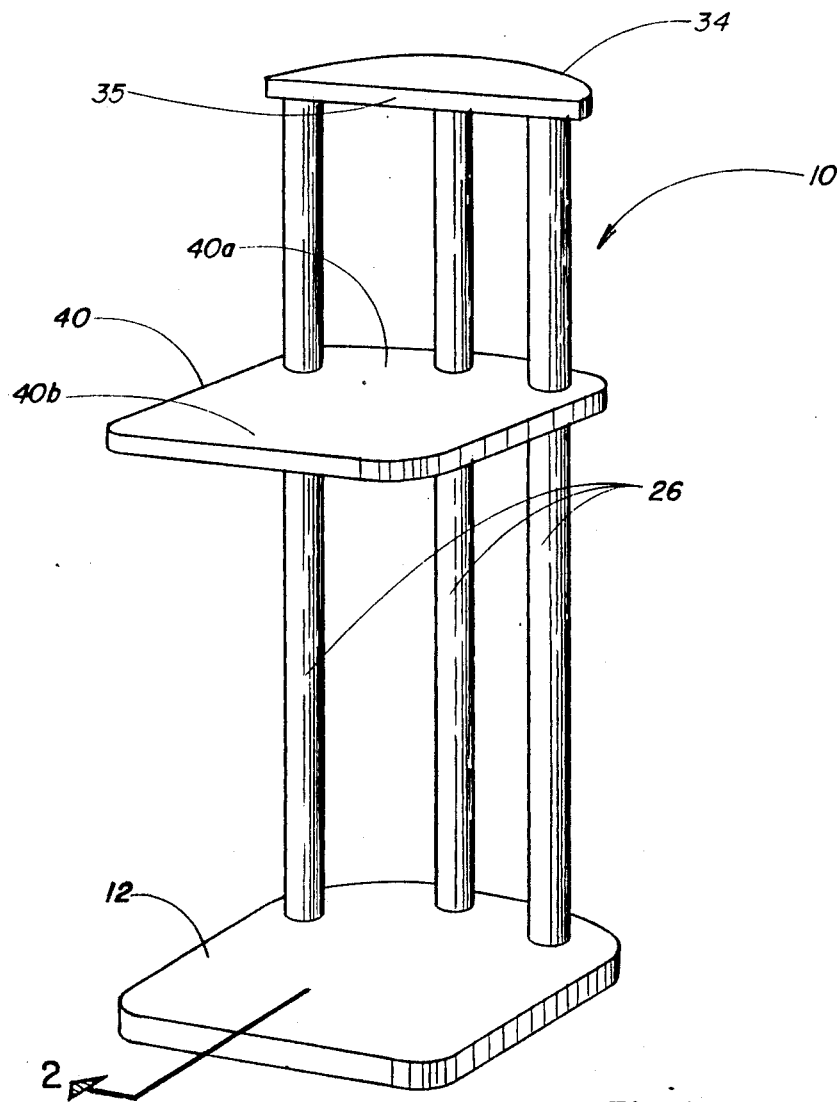
FIG. 1 is a perspective view of the adjustable height speaker support stand of the present invention.

Referring now to the drawings, the adjustable height speaker support stand is shown therein and indicated generally by the numeral 10.

Figure 2:
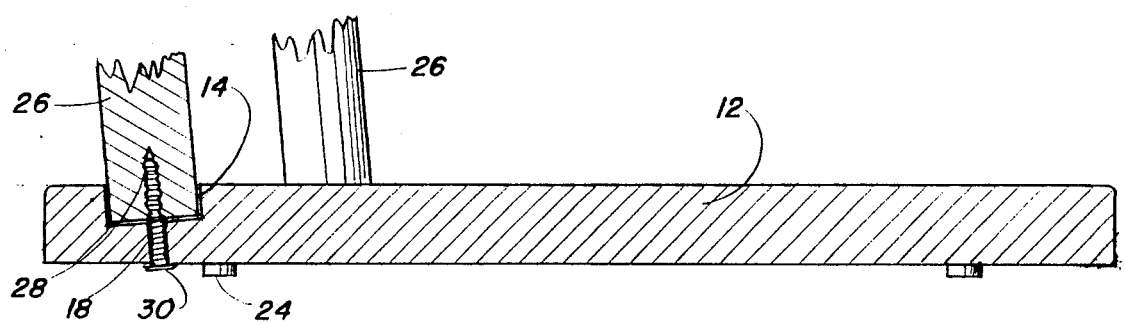
FIG. 2 is a cross-sectional view along line 2 of FIG. 1 showing a support dowel secured to the base.
Figure 3:
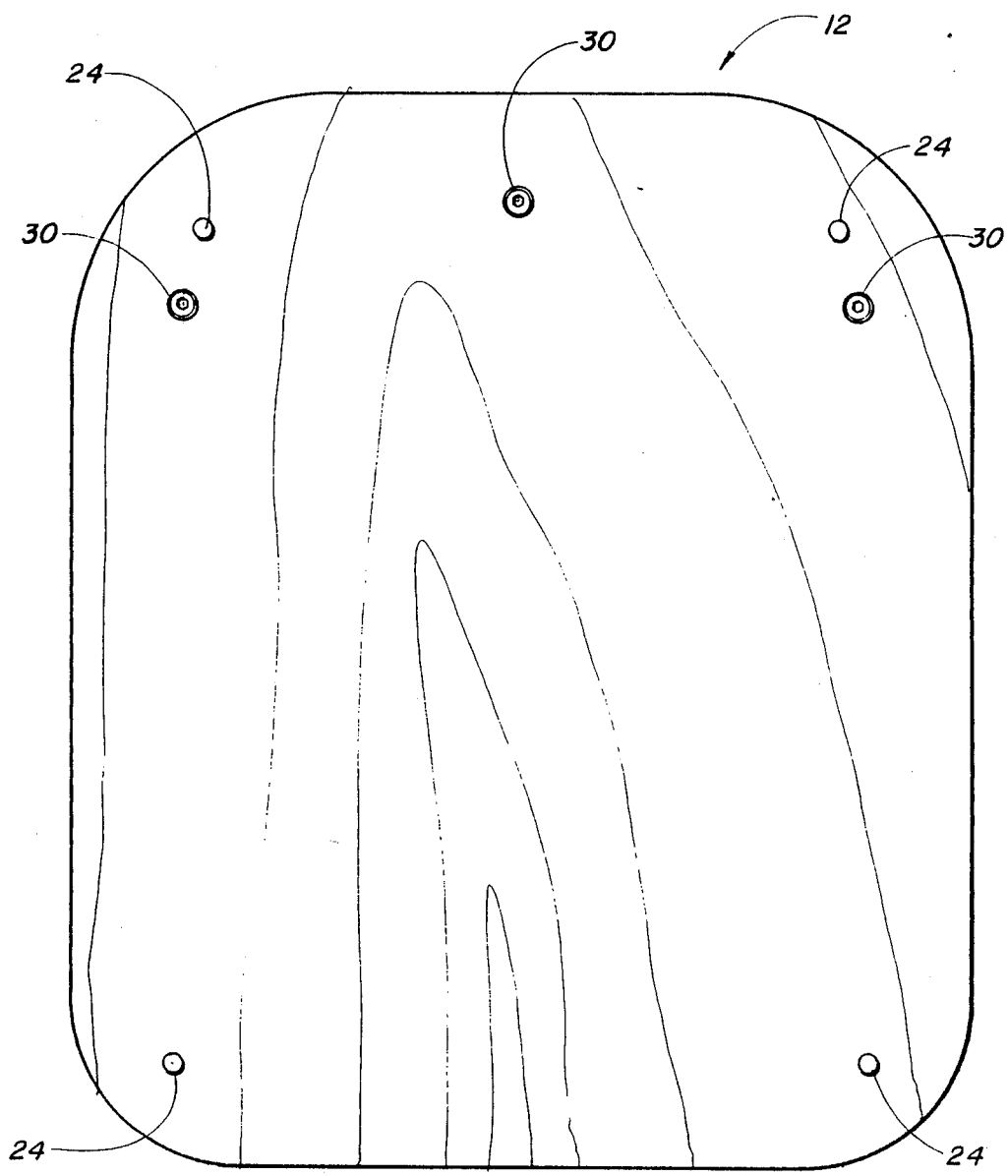
FIG. 3 is a bottom plan view of the speaker support stand base.
Figure 8:
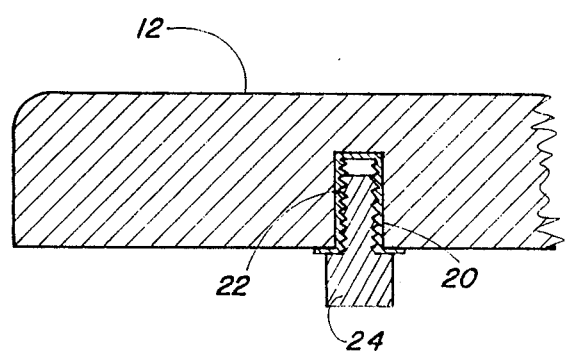
FIG. 8 is cross-sectional view of a portion of the base showing the rubber support pads.
Figure 9:
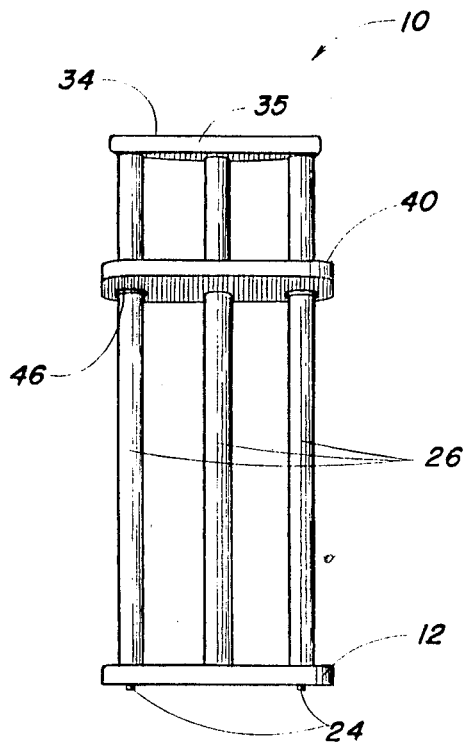
FIG. 9 is a front elevtional view of the speaker support stand.
Figure 10:
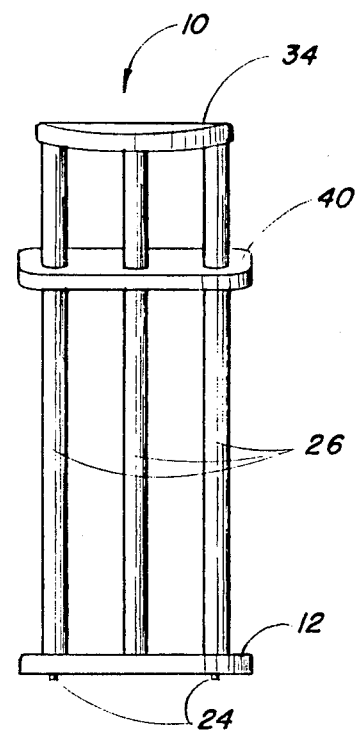
FIG. 10 is a back elevational view of. the speaker support stand.

Speaker stand 10 includes a base 12 comprising three slightly angled counter bores 14 formed in the top of base 12. As shown by FIG. 2, each counter bore 14 is angled at approximately 94 degrees with reference to the base 12 and has a through opening 18, also angled at 94 degrees, extending from each counter bore 14 through the bottom surface of the base 12. On the bottom surface of the base 12, as shown by FIGS. 3 and 8, are four base insert holes 20 with each insert hole 20 located at one corner of the base 12 and containing a base insert sleeve 22. Rubber pads 24 are inserted into the base insert sleeve 22 and extend outward from the bottom surface of the base 12. The base 12 rests upon the rubber pads 24 which contact the floor or surface on which the base 12 rests in order to maintain a stable support stand 10 by absorbing vibrations from the floor or speaker. If the support stand 10 is placed on carpet, the rubber pads 24 can be replaced by a gripping device such as metal spikes which are screwed into the base insert sleeves 22 and used to maintain a stable support on a carpeted floor.

Figure 4:
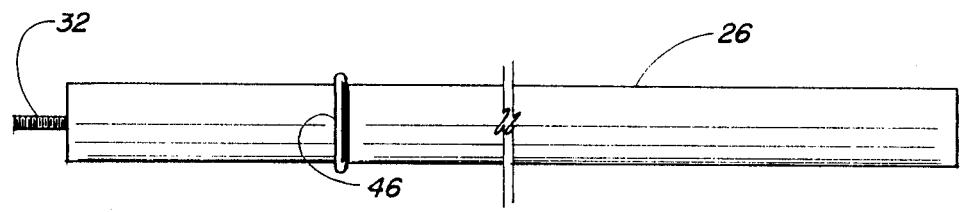
FIG. 4 is an elevational view of a support dowel.

Inserted into the counter bores 14 of the base 12 are support dowels 26. The support dowels 26 extend vertically upwards from the base 12 at approximately a 94 degree angle. Support dowels 26, as shown by FIGS. 2 and 4, include a threaded dowel opening 28 formed in at the bottom of the support dowel 26 for connecting the support dowel 26 to the base 12. The bottom of the support dowels 26 are inserted into the counter bores 14 and then an assembly allen screw 30 is inserted and screwed from the bottom of the base 12 into the through opening 18 and then into the dowel's threaded opening 28 to provide the dowels 26 with a secure connection to the base 12. The attached dowels 26 extend vertically upward at a 94 degree angle from the base 12 and a dowel screw 32 extends from the top of each dowel 26.

Figure 6:
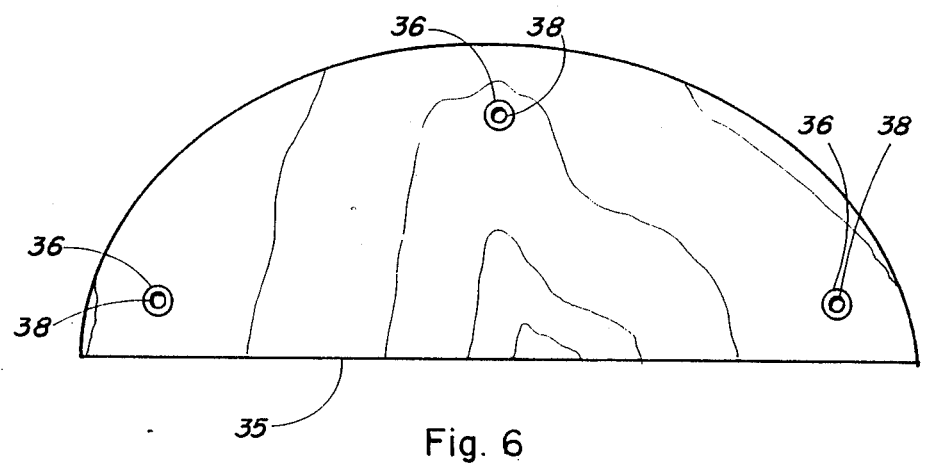
FIG. 6 is a bottom plan view of the top connector of the speaker stand.

A top dowel connector 34 is attached across the tops of the support dowels 26. As shown by FIG. 6 top dowel connector 34 includes three connector screw holes 36 and threaded connector insert sleeves 38 which are inserted into the connector screw holes 36. To attach the support dowels 26 to the top connector 34, the dowel screw 32 extending from the top of each dowel 26 is screwed into a respective threaded insert sleeve 38 in the bottom of the top connector 34. This attachment helps provide a stable and sturdy stereo support stand 10. In addition, the top connector 34 has a support surface 35 that can be used to rest the back of a speaker 16 against to provide additional stabilization.

Figure 5:
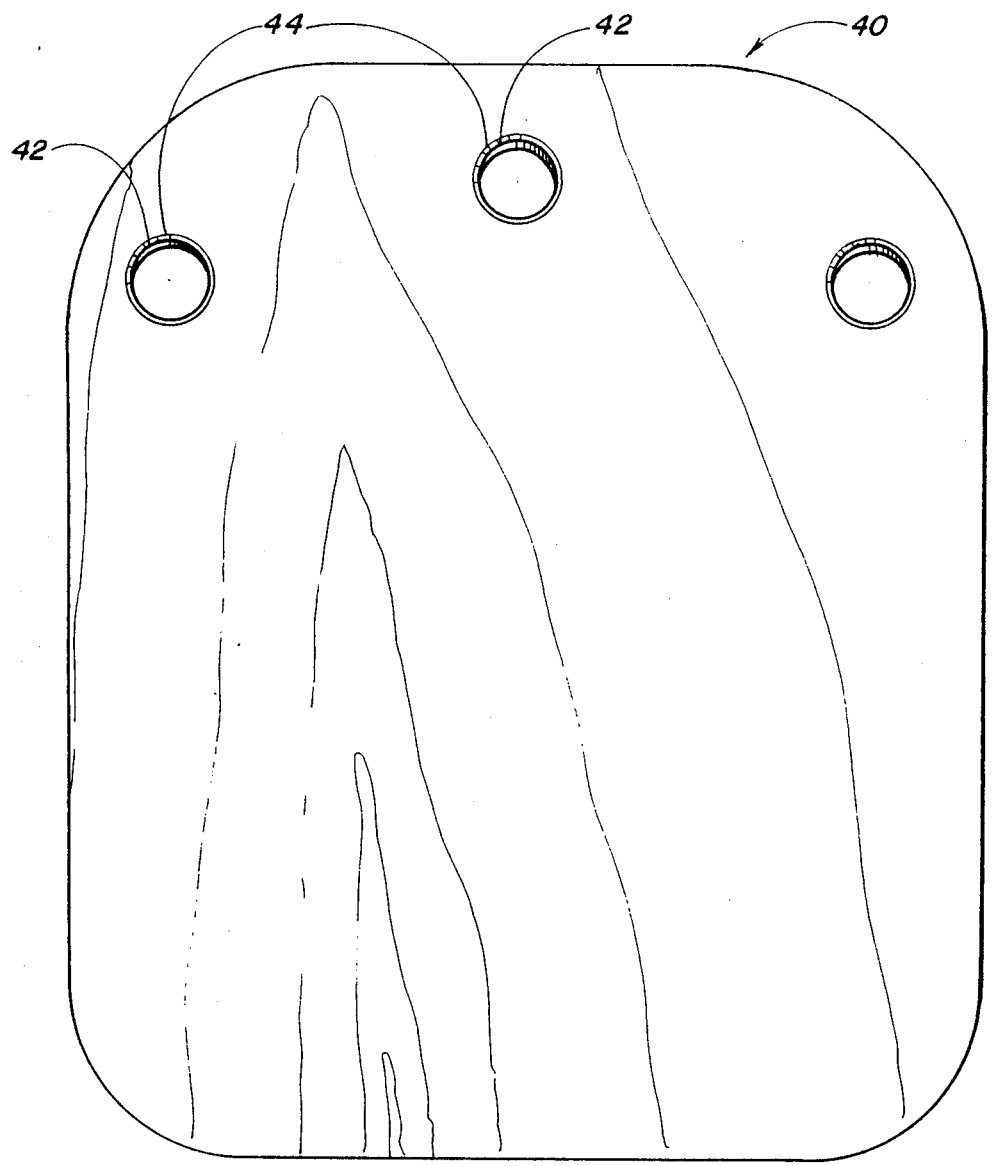
FIG. 5 is a bottom plan view of the speaker support shelf.
Figure 7:
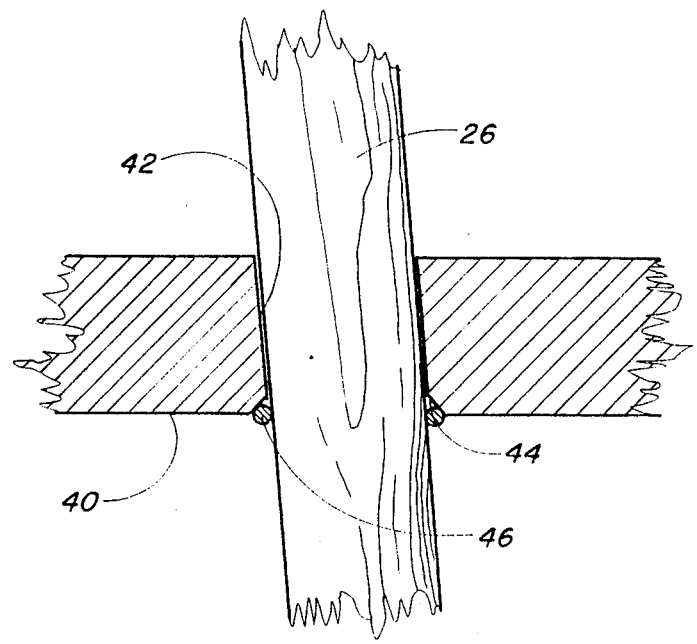
FIG. 7 is a fragmentary cross-sectional view showing the interconnection between the support dowels and the speaker support shelf.

Disposed between the base 12 and connector top 34 is a speaker support shelf 40. As shown in FIG. 5, support shelf 40 has a rear portion 40a and a front portion 40b. Rear portion 40a of the support shelf 40 includes two forward and one rear support shelf openings 42 which all extend completely through the support shelf 40. The support shelf openings 42 for the preferred embodiment, as shown in the drawings, are completely encircled by the support shelf 40. However, the openings 42 in the support shelf 40 could be alternatively designed such that one or more of the openings 42 were not completely encircled by the support shelf 40, but wherein a portion of the support shelf 40 forming the opening 42 still bore against the support dowel 26. The support dowels 26 are inserted through the respective support shelf openings 42, and the support shelf 40 can be moved along the support dowels 26 between the base 12 and top connector 34. As shown in FIGS. 5 and 7, the forward pair of openings 42 have lower chamfered edges 44 about the bottom thereof. These chamfered edges 44 are used to closely inter-fit o-rings 46 on the support dowels 26 against the support shelf 40, as shown in FIG. 7. The front portion 40b of the support shelf 40 extends forwardly from the support shelf's rear portion 40a and inserted dowels 26 to form a platform for the speaker 16.

The operation and adjustment of the speaker stand 10 to position the speaker 16 at the desired height along the support dowels 26 is quick and easy. The first step for adjustment is to remove the o-rings 46 from the chamfered edges 44 of the openings 42 on the bottom side of the support shelf 40 by rolling them down the dowels 26. Next, the support shelf 40 is adjusted along the support dowels 26 to the desired position. However, due to the 94 degree angle of the support dowels 26 and the support shelf's weight extending outwards from the support dowels 26, forces are exerted between support shelf openings 42 and dowels 26 causing the support shelf 40 to lock into a fixed position on the dowels 26. Thus, to adjust the position of the support shelf 40 the support shelf's front section 40b is tilted slightly upward to align the support shelf openings 42 with the dowels 26 and offset the locking forces between the two; then the support shelf 40 can be adjusted to the desired height. The o-rings 46 are then moved along the dowels 26 into the chamfered area 44 of the support shelf openings 42.

Figure 11:
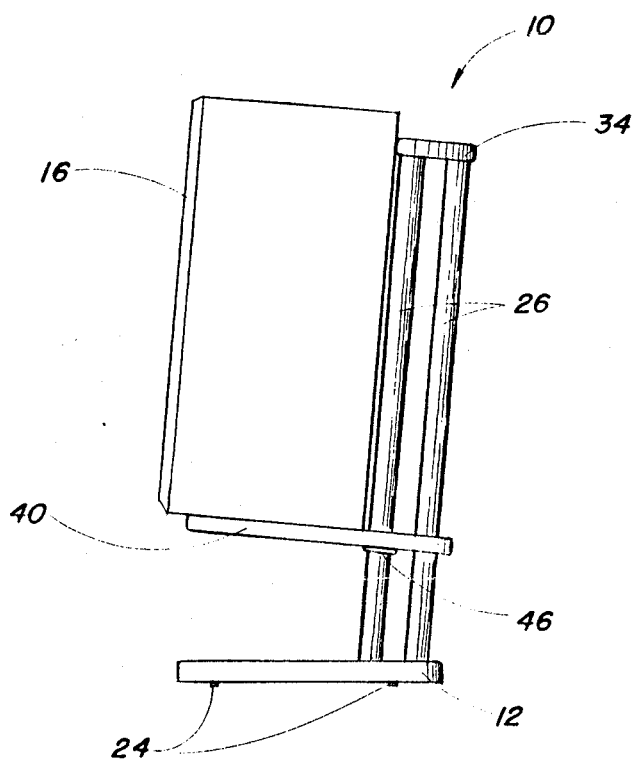
FIG. 11 is a side perspective view of the speaker support stand with a speaker on the support stand.

After these steps, speaker 16 is placed on the support shelf's front section 40b. Support shelf 40 with the speaker 16 resting upon it is securely fixed into position by forces exerted between the encircling walls of the support shelf openings 42 and the support dowels 26. More specifically, the weight of the speaker 16 on the support shelf's front section 40b produces rotational forces in the support shelf 42 about the support dowels 26 which increases the frictional forces between the encircling walls of the openings 42 and the respective support dowels 26, thus preventing the support shelf 40 from moving down the dowels 26. It is appreciated that in use the forward portions of the two forward openings 42 form bearing surfaces against which the forward most dowels 26 bear against when the support shelf 40 is loaded. Likewise, the rearmost opening 42 encircles the rearward dowel 26 and the back portion of this opening 42 bears against the rearward portion of the rearward dowel 26 when the shelf 40 is loaded. In addition, the 94 degree angle of the support dowels 26 causes the speaker weight to produce forces generally perpendicular to the support dowels 26 and also helps improve the over-all stability of the support stand 10. A secondary support mechanism is provided by the o-rings 46 in the chamfered area 44 on the bottom of the support shelf 40. O-rings 46 provide a jam between the chamfered area 44 and the support dowels 26 which prevents the support shelf 40 from moving downward along the support dowels 26. This jamming effect of the o-rings 46 is significantly essential when the support shelf 40 is inadvertently titled backwards causing a reduction in the frictional forces about the support dowels 26 which lock the support shelf 40 in place. Depending upon the position of the support shelf 40 and the size of the speaker 16, the back of the speaker 16 may be rested against the connector's support surface 35 as shown in FIG. 11, to provide additional speaker stabilization. To readjust the height of the speaker 16, the speaker is simply removed from the support shelf 40 and the previously described steps are repeated.

Accordingly, the present invention may, of course, be carried out in other specific ways than those herein set forth without parting from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A speaker support structure for elevating and supporting a speaker comprising:
   (a) a base;
   (b) at least three support dowels attached to the base and extending upwardly from the base, the dowels including a first support dowel located laterally between second and third support dowels that are both spaced forward of the first support dowel;
   (c) a support shelf extending forwardly from the support dowels and adjustable vertically along the support dowels, the support shelf having openings corresponding to the support dowels such that the support dowels can be inserted through the corresponding support shelf opening allowing the support shelf to be vertically adjustable along the support dowels; and
   (d) wherein the support shelf tends to pivot about the support dowels when a speaker is placed on the support shelf, causing a locking action at the support shelf openings and the dowel supports which prevents the support shelf from moving downward on the dowel supports.

2. The speaker support structure of claim 1 further comprising a top connector member connected at the top of the support dowels for providing added stability to the support dowels and wherein the support shelf can be positioned vertically between the base and the top connector member.

3. The speaker support stand of claim 2 wherein the top connector member has a surface for which the speaker can be rested against to provide support for the speaker.

4. The speaker support structure of claim 1 wherein selected support shelf openings are chamfered on the bottom side of the support shelf, and wherein O-rings are fitted around the support dowels and positioned into the chamfered area to provide a secondary locking mechanism to prevent the support shelf from sliding downwards when a speaker has been placed on the support shelf.

5. The speaker support structure of claim 1 wherein the support dowels are secured to the base in a non-perpendicular fashion such that the dowels are tilted backwards and the interconnected support shelf is also tilted backwards such that the front portion of the speaker shelf is positioned vertically higher than the back portion of the speaker shelf.

6. A speaker support structure for elevating and supporting a speaker comprising: a base; a series of support dowels secured to the base and extending upwardly therefrom, the support dowels including two laterally spaced forward dowels and one rearward dowel spaced rearwardly of the two forward dowels and positioned generally between the forward dowels; a speaker support shelf having a front section for receiving the speaker and a rear section having three openings formed therein in a configuration similar to the spacing configuration of the dowels such that the dowels may be inserted through the respective openings; and wherein the speaker support shelf can be vertically adjusted up and down the dowels and can be stationed and secured at a selected height by placing a speaker on the front section of the speaker support shelf, giving rise to a binding action between the respective openings and dowels causing the speaker support shelf to be firmly held about the dowels at the selected height.

7. The speaker support stand of claim 6 further comprising a top connector member connected at the top of the support dowels for providing added support to the support dowels and wherein the support shelf can be positioned at an infinite number of positions between the base and the top connector member.

8. The speaker support stand of claim 7 wherein the top connector member has a surface for which the speaker can be rested against to provide support for the speaker.

9. The speaker support structure of claim 6 wherein the bottom side of the support shelf are chamfered about selected support shelf openings, and wherein o-rings are fitted around the support dowels and positioned into the chamfered area of the support shelf to provide a secondary locking mechanism to prevent the support shelf from sliding downwards when a speaker has been placed on the support shelf.

10. The speaker support stand of claim 6 wherein support dowels are secured to the base in a non-perpendicular fashion such that the dowels are tilted backwards and form an obtuse angle between the support dowels and the portion of the base underlying the front portion of the support stand.

11. A speaker support structure for elevating and supporting a speaker comprising: a base; a plurality of support dowels secured to the base and extending upwardly therefrom; a speaker support shelf having a front section for receiving the speaker and a rear section having openings formed therein in a configuration similar to the spacing configuration of the dowels such that the dowels may be inserted through the respective openings; and wherein the speaker support shelf can be vertically adjusted up and down the dowels and can be stationed and secured at a selected height by placing a speaker on the front section of the speaker support shelf, giving rise to a binding action between the respective openings and dowels causing the speaker support shelf to be firmly held about the dowels at the selected height.

12. The speaker support structure of claim 11 wherein the support dowels are secured to the base in a non-perpendicular fashion such that the dowels are tilted backwards and form an obtuse angle between the support dowels and the portion of the base underlying the front portion of the support stand.

13. A vertically adjustable support structure for supporting a speaker or other related type of appliance comprising: a base; a plurality of spaced apart elongated shelf support members secured to the base and extending generally upwardly therefrom; a support shelf cantilevered from the plurality of elongated shelf support members and vertically adjustable thereon at an infinite number of positions; the support shelf having a forward load support area and a rear bearing area including support bearing means for engaging respective vertical support members that extend generally vertically past the support shelf; the support bearing means including at least one opening formed within the support shelf and having an elongated support member extending therethrough, and a cooperating bearings surface associated with the support shelf for engaging and bearing at least one other vertical support member extending vertically past the support shelf; and wherein the vertical support members are strategically spaced with respect to each other and the load support area of the support shelf so as to produce a binding and blocking action in response to a load being placed on the load support area of the support shelf, the binding and locking action resulting from the strategic placement of the vertical support members with respect to the load support area of the support shelf and the support bearing means of the support shelf.

14. The adjustable support structure of claim 13 wherein the openings formed within the support shelf is spaced rearwardly from the load support area, and wherein the cooperating bearing surface is disposed intermediately between the opening and the load support area.

* * * * *